United States Patent

[11] 3,591,755

| [72] | Inventor | Robert Holbrook Cushman<br>Princeton, N.J. |
|---|---|---|
| [21] | Appl. No. | 831,164 |
| [22] | Filed | June 6, 1969 |
| [45] | Patented | July 6, 1971 |
| [73] | Assignee | Western Electric Company<br>New York, N.Y. |

[54] FUSION BONDING
8 Claims, 22 Drawing Figs.

[52] U.S. Cl. .................................................. 219/50,
219/118, 29/498
[51] Int. Cl. .................................................. H05b 1/00
[50] Field of Search ........................................ 219/50, 91,
117, 162; 29/498

[56] References Cited
UNITED STATES PATENTS
| 2,360,950 | 10/1944 | Kilgour .................... | 219/50 X |
| 3,016,085 | 1/1962 | Gassner .................... | 156/359 |

Primary Examiner—J. V. Truhe
Assistant Examiner—Hugh D. Jaeger
Attorneys—H. J. Winegar, R. P. Miller and W. M. Kain

ABSTRACT: Workpieces fabricated from lead, or other metallic materials having substantially similar characteristics, are fusion bonded by first abutting the workpieces to define an interface therebetween, and then inserting a heated bonding tool into the workpieces, at the interface, to create a localized zone of molten material about the bonding tool. The tool is then moved, relative to the workpieces, so that the molten zone of material traverses the interface, the molten zone cools and resolidifies behind the trailing edge of the tool, thereby gonding the workpieces one to the other.

FIG. 1

PATENTED JUL 6 1971 3,591,755

FUSION BONDING

BACKGROUND OF THE INVENTION

1. Field of the Invention

This invention relates to bonding and more particularly to a method of metal-to-metal fusion bonding.

2. Description of the Prior Art

In industry it is frequently necessary to bond one workpiece to another. There are many existing techniques which may be used to accomplish this bonding. The precise technique used in any given application depends to a great extent upon the size of the workpieces to be bonded and the material from which they are constructed. Examples of bonding techniques widely used in industry are welding, thermocompression bonding, ultrasonic bonding, and percussion welding.

There are, however, many workpieces which do not lend themselves to any of the above-mentioned techniques. For example, a workpiece may be too small and fragile to be bonded by conventional gross welding techniques, but too large for ultrasonic or thermocompression bonding. Even if the workpiece is of a suitable size, it may, nevertheless, be made of a material which has too low a melting point to permit a satisfactory bond between it and another workpiece by means of these techniques. The metal lead, for example, has a melting point of 630° F., which is low compared to, say, the 3,000° F. melting point of steel. It is for this reason that conventional bonding techniques, satisfactory for use with workpieces fabricated from other metals, are not satisfactory for use with workpieces made from lead or any other metal or metallic alloy having similar characteristics.

As is well known, lead is widely used in the plumbing industry and in the manufacture of automobile batteries. As a result, lead-to-lead bonds are commonplace. A typical prior art technique for making these bonds involves directing a gas jet or heliarc onto the bond area to puddle the lead and thereby form a gross type of fusion bond between the workpieces. Unfortunately, this form of bonding is difficult to control precisely and, typically, the appearance of the finished bond is rough and jagged. If desired, the appearance of the bond may be improved, somewhat, by abrading or polishing the bond area to obtain a smooth finish. However, if the workpiece is so constructed that access cannot be conveniently had to one or more of the bond surfaces, then it is not possible to smooth out the bond in this manner and little can be done, after the fact, to improve the quality of the bond. This is a special problem in the battery industry, for example, where the absence of voids in the bond area is highly advantageous.

SUMMARY OF THE INVENTION

In accordance with the principles of this invention, smooth, high-quality bonds are made between a first and a second workpiece by first moving the workpieces into abutting relationship to define an interface therebetween and then inserting a heated binding tool into the workpieces, in the region of the interface, to form a zone of molten metallic material about the tool. The tool is then moved, relative to the first and second workpieces, so that the tool traverses at least a portion of the interface. The zone of molten material formed about the tool solidifies and returns to its original state behind the trailing edge of the tool, as the tool traverses the interface, thereby bonding the first and second workpieces one to the other.

One specific illustrative apparatus for practicing the above method comprises a frame for supporting the first and second workpieces in abutting relationship to define the interface therebetween, a bonding tool, means for raising the temperature of the bonding tool to at least the melting point of the first and second workpieces, and means for inserting the tool into the workpieces, at the interface, to form a local zone of molten material therein and for moving the bonding tool, relative to the workpieces, so that the tool traverses at least a portion of the interface, thereby bonding the workpieces one to the other.

OBJECT OF The Invention

It is an object of this invention to provide smooth bonds between a first and second metallic workpiece.

It is a further object of this invention to provide smooth, void-free fusion bonds between first and second metallic workpieces, where the workpieces are both fabricated from material having a relatively low melting point.

DETAILED DESCRIPTION

The instant invention arose from research which was directed towards the general problem of providing smooth, high-quality lead-to-lead bonds between the plates of the circular lead battery disclosed in U.S. Pat. No. 3,434,883, which issued on Mar. 25, 1969, in the name of L. D. Babusci et al. It will be appreciated by one skilled in the bonding art, however, that the methods and apparatus of this invention are not limited to bonding lead battery plates, but are applicable to a wide range of workpiece configurations and an even wider range of workpiece materials. In theory, there is no inherent limitation on the kinds of metallic materials which may be bended by this invention. However, as one moves further and further away from materials having characteristics similar to lead, other bonding techniques may become more attractive.

Table I, below, sets forth some of the more common metals and alloys which may be advantageously bonded by the methods and apparatus of this invention. The list is not all inclusive, however, and many other bondable alloys have not been listed.

TABLE I

| Material | Melting point, °F. |
|---|---|
| Lead | 630 |
| Tin | 449 |
| Cadmium | 608 |
| Zinc | 786 |
| Magnesium | 1,203 |
| Aluminum | 1,220 |
| 50% lead; 50% tin; alloy (solder) | 428 |
| 90% tin; 8% antimony; 2% copper alloy (Britannia metal) | 437 |
| 90% lead; 10% antimony alloy (Magnolia) | 518 |

As used herein, the term "metallic" is intended to encompass metals, near-metals, semimetals as well as alloys and mixtures thereof.

Figure 1:
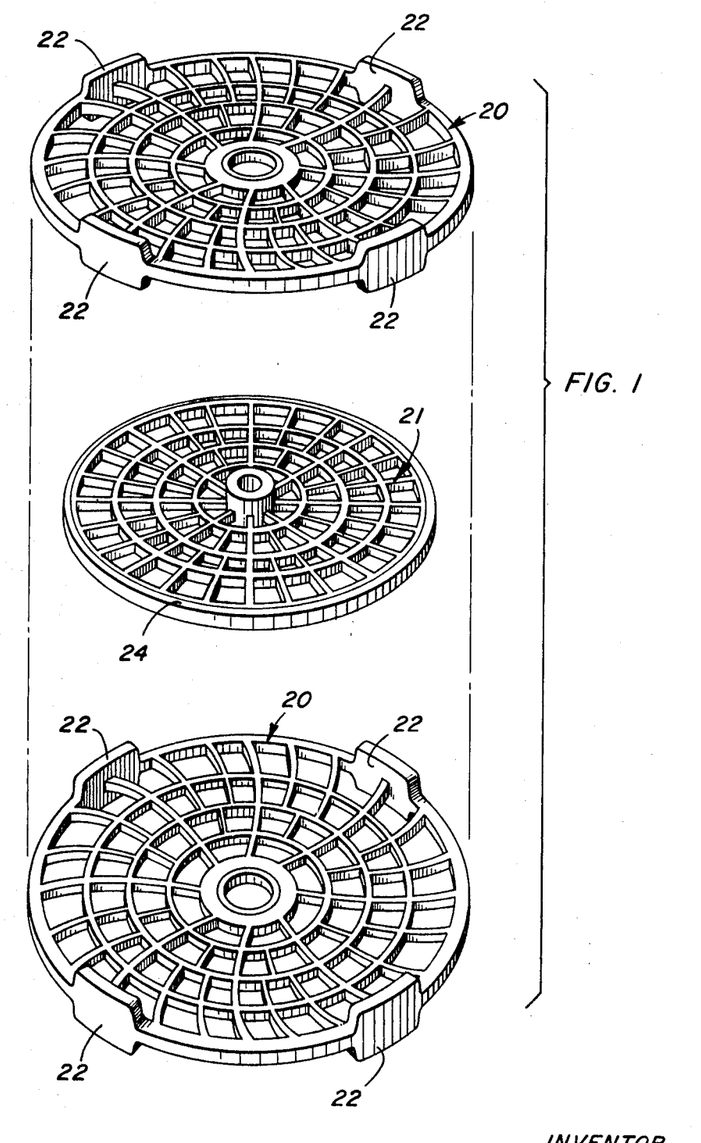
FIG. 1 is an exploded view of the plates of a circular lead-acid battery which may be advantageously bonded according to the principles of this invention.

As an example of the type of workpieces which may be advantageously bonded by means of this invention, FIG. 1 is an exploded view of a portion of the circular lead-acid battery disclosed in U.S. Pat. No. 3,434,883. The portion shown comprises two identical positive plates 20 and one negative plate 21. Each of the positive plates 20 is provided with a plurality of bonding lugs 22 symmetrically disposed about the outer circumference thereof. These lugs also serve to space apart the plates 20 when assembled together to form the completed battery.

Figure 2:
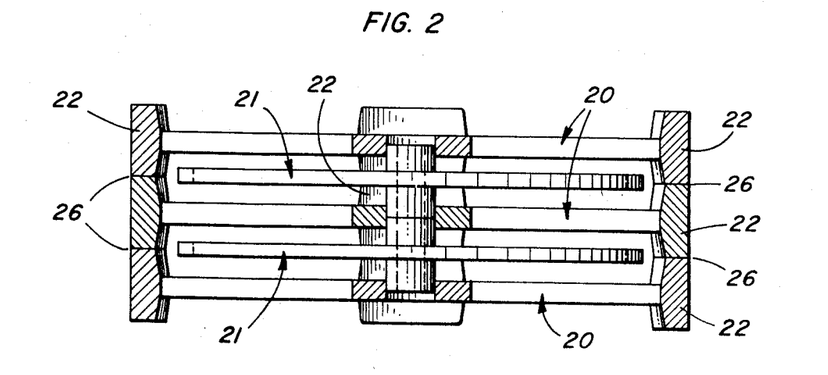
FIG. 2 is a cross-sectional view of the battery plates illustrated in FIG. 1 when assembled in their normal configuration.

FIG. 2 illustrates the manner in which three positive plates 20 and two negative plates 21 are stacked to form a complete battery. The interfaces 26 between adjacent pairs of bonding lugs 22 are the regions of the plates to be bonded. For clarity, only the outermost left and right bond regions have been shown in FIG. 2.

Figure 3A:
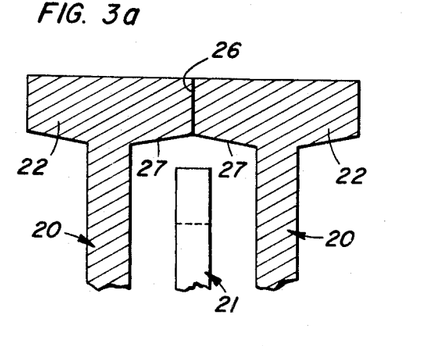
FIG. 3a is a partially cross-sectional view of a pair of abutted battery plates, of the type illustrated in FIGS. 1 and 2, showing the regions thereof to be bonded in greater detail.

As previously discussed, the physical arrangement of some workpieces renders the use of a heliarc or a gas jet unsatisfactory for bonding, due to the impracticality of smoothing or polishing the finished bond to obtain a void-free surface. It will be noted that in the portion of the circular battery shown in FIG. 3a, it would be extremely difficult to insert any type of bonding tool into the void between the outer surface of negative plate 21 and the inner sloping surfaces 27 of bonding lugs 22.

Figures 3B, 4:
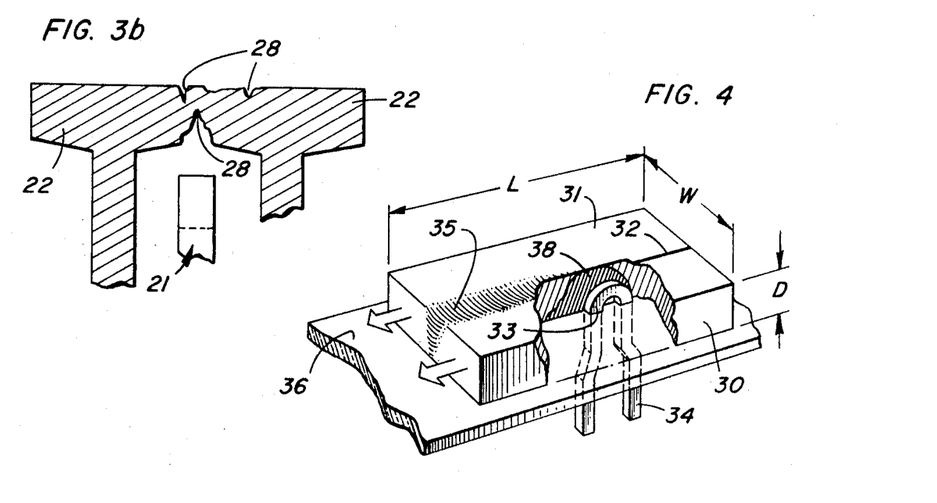
FIG. 3b depicts the bond region of FIG. 3a after an unsatisfactory bond has been effected.
FIG. 4 is a partially cutaway, isometric view of an illustrative bond region showing in greater detail one of the bonding techniques of this invention.

As previously noted in table I, the melting point of lead is approximately 620° F. A heliarc torch, however, can attain temperatures well in excess of 5,000°. Thus, if any attempt were made to bond plates 20 together with such a heliarc, great difficulty would be experienced in preventing molten lead from falling down, under the influence of gravity, onto the adjacent negative plate 21 or into the area between negative plate 21 and either, or both, of the adjacent positive plates 20, thereby shorting the plates together and ruining the battery. Even if the battery plates were oriented in such a manner that the molten lead tended to flow away from negative plate 21, the rear face of the bond would, in general, be rough and pitted and contain fissures 28, as shown in FIG. 3b. This is not only undesirable from the standpoint of the physical strength of the bond, but in the case of a battery, renders the bond subject to attack, the mechanism of which is not yet fully understood, but which is believed to be caused by corrosion of the bond by the electrolyte and/or volumetric expansion of the lead in the bond region as the battery undergoes successive charge-discharge cycles.

Figure 3C:
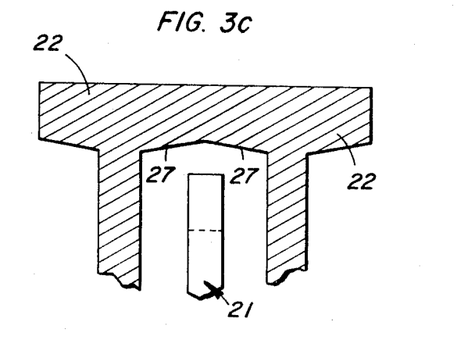
FIG. 3c depicts the bond region of FIG. 3a after a satisfactory bond has been effected.

FIG. 3c illustrates the type of smooth bond desired for the satisfactory operation of a circular lead-acid battery. It will be noted that no cracks or fissures exists at the rear face 27 of the bond. Thus, with a bond of this quality, there will be no gradual erosion by the electrolyte and no premature failure of the battery.

FIG. 4 schematically illustrates the production of a high quality fusion bond by one of the novel methods of this invention. In this method, a first workpiece 30 and a second workpiece 31 are moved into abutting relationship to define an interface 32 therebetween. (In FIG. 4, workpieces 30 and 31 are not intended to represent any specific workpieces, but are merely illustrative. In actual practice, workpieces 30 and 31 might comprise a pair of the bonding lugs 22 shown in FIGS. 1, 2 and 3.) The tip 33 of a heated bonding tool 34, shown in partial outline, is heated to a temperature in excess of the melting point of the workpieces and then inserted into interface 32 at a first position, advantageously an extremity, in the abutted workpieces, to create a localized zone 38 of molten material about the tip. Tip 33 is then moved, relative to the workpieces, along interface 32 to a second position, advantageously the other extremity. As tip 33 is moved, relative to the workpieces, the molten material in the localized zone to the rear of the bonding tip cools, resolidifies, and returns to a crystalline state, as shown at 35, thereby forming a fusion bond between the workpieces.

The bonding tip 33, shown in FIG. 4, extends outwardly from a flat planar backup plate 36, advantageously a plate of electrically nonconducting, heat-resistant material, such as transite. If the workpieces to be bonded were nonplanar, for example if they were curved as are bonding lugs 22, then backup plate 36 would be correspondingly curved. Tip 33 may be heated by any of several known methods, for example, by the passage of an electrical current therethrough or by conduction from a heating element mounted within the body of bonding tool 34. In order to transfer the maximum amount of thermal energy to the workpieces to be bonded, tip 33 must be a good thermal conductor, preferably metallic.

It will be noted in FIG. 4 that tip 33 does not extend into the bond interface for the full depth D of the workpieces and thus does not break the surface tension of the upper surface of the molten lead. This fact accounts, in part, for the high-quality bonds which may be obtained according to the methods of this invention. Notwithstanding the fact that tip 33 does not penetrate through the workpieces, the molten zone 38 which is created about tip 33 does extend for the full depth of the workpieces. This effect is not fully understood but is believed to be the result of thermal conduction within the body of the workpieces and of the extremely high magnetic field which is established around tip 33 (when heated by electrical current). This field is generated by the high current necessary to heat the tip above the melting point of lead. A small "fountain" of molten lead has been observed above the tip under some circumstances. If the localized zone did not extend for the entire depth of the workpieces, then a portion of each workpiece would remain unbonded, weakening the bond and, in the case of the plates of the circular lead-acid battery, creating an unbonded fissure which might be attached by the battery electrolyte.

The depth to which tip 33 penetrates into the workpieces and hence the size of molten zone 38 may be controlled by altering the height that tip 33 extends outwardly from backup plate 36. The ease with which tip 33 penetrates into the bond is a function of the materials from which workpieces 30 and 31 are fabricated and of the applied pressure. However, for metals such as lead, even a moderate force will suffice to push tip 33 into the workpieces until backup plate 36 contacts the lower surface of the workpieces to limit further insertion of the tip.

Because bonding tool 34 is inserted into the workpieces from below, backup plate 36, which is considerably larger than the zone of molten material, tends to inhibit gravitational flow of molten material away from the bond area until a sufficient period of time has elapsed to permit the molten material to solidify behind the tip and form the bond.

In FIG. 4, bonding tip 33 is depicted as entering into the workpieces from the left and travelling along the length L of interface 32 to the far end of the workpiece at the right. It will be apparent, however, that for bonding applications where the presence of a partial void or crack is unimportant, the bonding tool could be inserted at some intermediate point along the bond interface and withdrawn from another intermediate point before the end of the interface is reached. Clearly, either the workpieces could be held stationary and the tip moved or the tip held stationary and the workpieces moved. However, because of the tendency of the molten metal to flow under the influence of gravity it is preferable to keep the workpieces stationary. This makes it easier to compensate for and inhibit the gravitational flow of molten lead.

Figure 5:
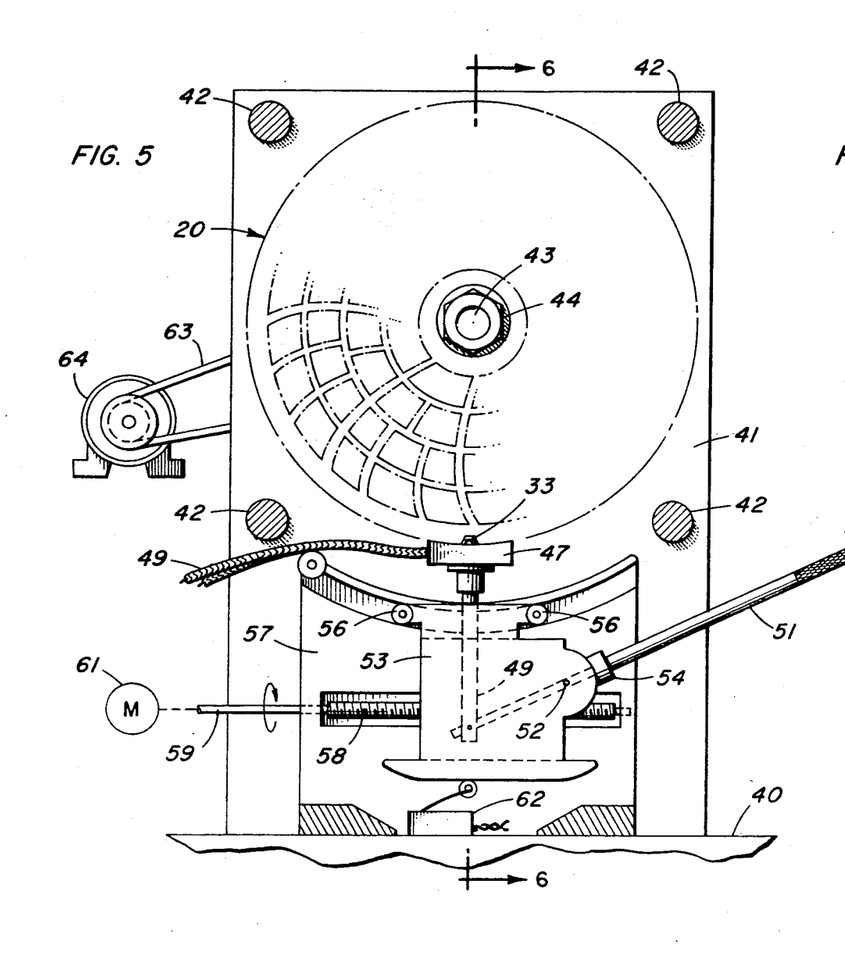
FIG. 5 is a front elevation view of a bonding apparatus which may be advantageously used for bonding the circular battery plates illustrated in FIG. 1.
Figure 6:
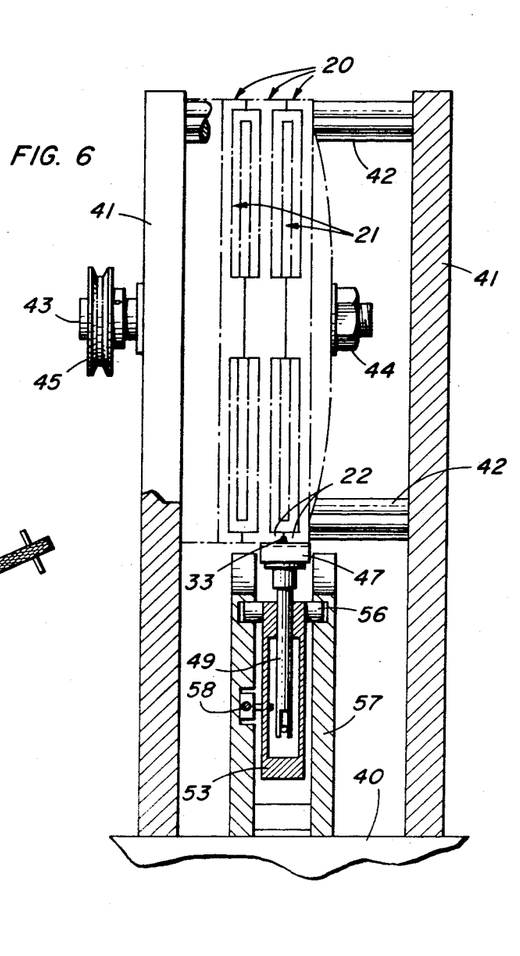
FIG. 6 is a partial section taken about section line 6–6 of the apparatus shown in FIG. 5.

FIGS. 5 and 6 depict one specific apparatus which may be used to bond circular battery plates of the type disclosed in U.S. Pat. No. 3,434,883. The apparatus comprises a base 40 supporting a pair of upwardly extending frame members 41 which are spaced apart by a plurality of spacers 42. The upper pair of spacers 42 may be removed to permit the insertion of an assembly of stacked positive and negative battery plates 20 and 21 which are coaxially mounted on a rotatable stepped shaft 43 extending outwardly through the rear frame member 41. The assembly of stacked plates 20 and 21 is secured to shaft 43 by a nut 44 so that the entire assembly may be rotated by means of a pulley wheel 45 mounted to rotatable shaft 43. The stacked battery plates are positioned initially so that abutting pairs of bonding lugs 22 are symmetrically disposed about a vertical plane passing through the center of the battery plates parallel to the axis thereof.

Figures 7, 8:
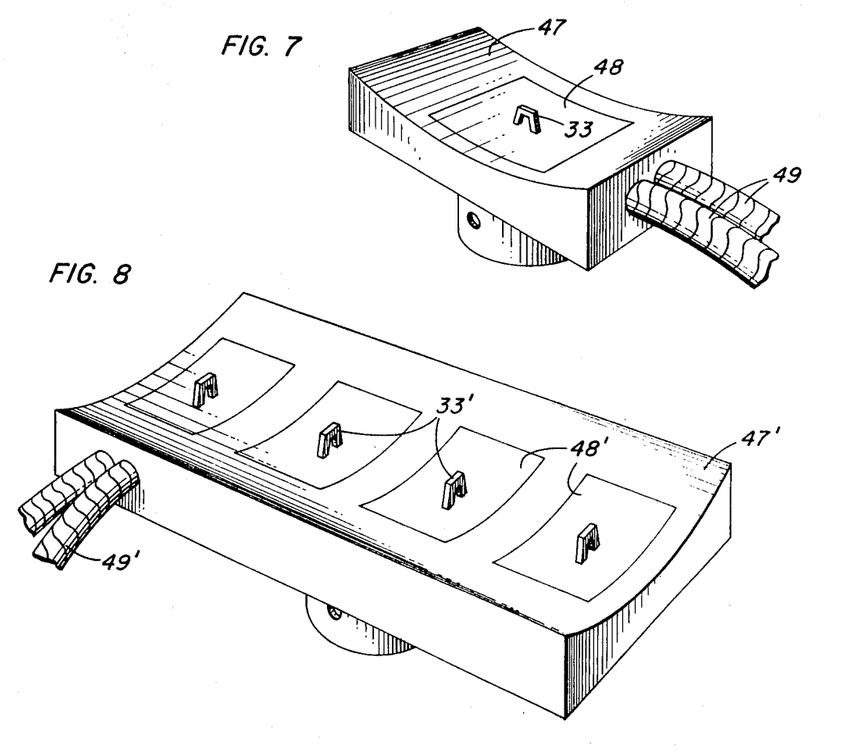
FIG. 7 is an isometric view of an illustrative bonding tool for the apparatus of FIGS. 5 and 6.
FIG. 8 is an isometric view of another bonding tool which may be used with the apparatus of FIGS. 5 and 6 to perform a plurality of simultaneous bonds.

Referring momentarily to FIG. 7, bonding tool 34 is mounted in a metallic base 47, which is shaped to conform to the outer circumference of the positive battery plates 20. A correspondingly shaped backup plate 48 of any suitable thermally and electrically nonconductive material, such as transite, is mounted within the body of base 47 so that the surface of the backup plate is flush with the upper surface of base 47. The tip 33 of bonding tool 34 extends upwardly through the aperture in backup plate 48 and a pair of electrical leads 49 connect bonding tool 34 to a source of AC or DC current (not shown).

Referring back to FIGS. 5 and 6, base 47 is mounted on a shaft 49 which is adapted for travel in the vertical plane under the control of a lever 51 which is pivoted at 52 to a carriage assembly 53. Rotation of lever arm 51 about pivot 52 raises base 47 into engaging contact with the outer surface of a pair of abutted bonding lugs 22 and inserts bonding tip 33 into the lugs, as discussed with reference to FIG. 4. A locking screw 54, mounted on lever 51, may be tightened to inhibit further motion of the lever once the battery plates have been inserted into the apparatus and the desired position of bonding tool 34 determined.

Carriage assembly 53 is provided with a pair of rollers 56 which travel in a curved slot within a guideway 57 so that carriage assembly 53, and hence bonding tip 33, will travel along an arcuate path around the circumference of battery plates 20 and bonding lugs 22. Carriage assembly 5 is moved along the arcuate path by means of a threaded screw 58 driven by a mechanical linkage, shown generally at 59, and a reversible electric motor 61.

A microswitch 62, connected to control circuitry (not shown), senses the start and end of each bond and may be used to alter the amount of current fed to tip 33 to raise it from its idle temperature to the bonding temperature and to terminate forward motion of carriage 53 after bonding tip 33 has completely traversed bonding lugs 22. Also, it may be used to control the electrical current fed from the AC or DC source (not shown) via leads 49 to bonding tool 34, to prevent burnout of the tip once the tip is no longer in physical contact with the bonding lugs.

A drive belt 63 coupled to pulley wheel 45 is driven by a second electrical motor 64, and indexes stepped shaft 43 to present successive pairs of abutted bonding lugs 22 to base 47 and bonding tip 33.

In operation, a pair of positive plates 20 and a corresponding negative plate 21 are assembled into a stacked array and fitted onto the stepped portion of shaft 43 while the upper pair of spacers 42 are temporarily removed from frame members 41. The stacked battery assembly is then securely fastened to shaft 43 by means of nut 44. Base 47 and bonding tip 33, which have previously been adjusted by means of lever arm 51 and locking screw 54 to the desired height, are then positioned at the extreme right of their arcuate path of travel. The battery assembly is then indexed by means of drive belt 63 and motor 64 so that the first pair of abutted bonding lugs 22 are symmetrically disposed about a plane passing through the center of the battery assembly parallel to shaft 43. Current is then supplied from the AC or DC source (not shown) via leads 49 to raise the temperature of tip 33 above the melting point of lead (630° F.), and motor 60 energized to move carriage 53 along the arcuate path defined by the slotted portion of base 47. As carriage 53 begins its arcuate travel, bonding tip 33 enters the interface between the first pair of abutted bonding lugs 22 and traverses an arcuate path through the bonding lugs 22 until it exits the interface at the far end thereof thereby bonding the positive battery plates 20 one to the other. At this time, microswitch 62 opens discontinuing further forward motion of carriage 53 and disconnecting the AC supply to bonding tip 33. Electrical motor 64 is then activated to rotate shaft 43 and the battery assembly through the angle of 90°, in the illustrative example, to present another pair of abutted bonding lugs 22 to the bonding assembly. At the same time, motor 61 is reversed to return carriage 53 to its initial position and the process is reiterated until all the pairs of abutted bonding lugs in the battery assembly are bonded.

Alternatively, since the bonding lugs are symmetrical, motor 60 may be arranged to move carriage 53 in alternate directions as each successive pair of abutted bonding lugs is presented to bonding tool 34. Thus, for example, the first bond is made from right to left, the second from left to right, and so on.

Because of the wiping effect of the molten lead, it has not been found necessary to clean bonding tip 33 between each bond. If, however, it is desired to clean the tip, an air blast or wire-tipped brush is satisfactory for this purpose.

An experimental bonding apparatus actually built and operated used an bonding tip manufactured from type 718 metal alloy which was heated to an idle temperature of approximately 1,100° F. The tip measured one-eighth inch square by one-fourth inch long and extended outwardly from a 1-inch by 2-inch transite backup plate. The bonding tip transferred approximately 6,000 watt-seconds of energy to the bond interface. Typical lead bonding lugs, measuring 2¼ inches long by three-sixteenth inches wide, where successfully bonded in the average time of 15 seconds. Successful bonds have also been made with tips made from Kanthal, tungsten and chromium-plated tungsten.

Unlike the high temperatures normally associated with heliarc bonding, the bonding methods of this invention utilize relatively low temperatures, thus, the workpieces themselves do not become excessively heated and distorted. The relatively low bonding temperatures employed reduce the tendency for oxides to form on the surface of the workpieces or on the bond interface. The formation of oxides is also inhibited by the presence of backup plate 36 which tends to prevent air from contacting the bond area. THe entire apparatus may be enclosed in a protective atmosphere, if the workpieces are fabricated from metals or metallic alloys which are unduly susceptible to oxidization.

When the instant invention is used to bond circular workpieces, such as the plates of the above-discussed circular battery, the arcuate shape of the bonding lugs and backup plate 36, tends to cause the molten lead in the localized zone of molten material to flow down the bonding lugs towards the bond interface. This effect occurs mainly at the beginning and end of each bond, whether the bonding tip is entering the abutted bonding lugs from the left or exiting from the right. Thus, the molten metal always tends to flow down towards the main part of the bond and the normally undesirable effects of gravity are turned to useful account.

While the bonding apparatus of FIGS. 5 and 6 is shown as bonding only one battery cell; an actual battery may have more than one cell. In that event, stepped shaft 43 and spacers 42 would be extended to accommodate the greater number of plates and base 47 similarly extended, as shown in FIG. 8, to include a plurality of backup plates 48 and a plurality of bonding tips 33 spaced apart by a distance corresponding to the distance between successive bonding interfaces in the battery assembly.

Figure 9A:
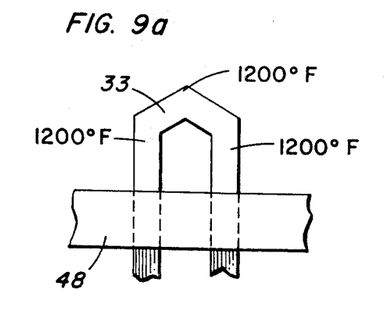
FIG. 9a is a partially schematic front view of a heated bonding tip, prior to insertion into the bond region of a pair of abutted workpieces, showing the temperature profile of the tip.
Figure 9B:
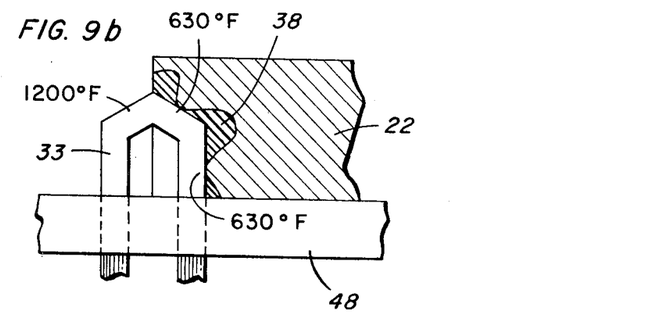
FIG. 9b is a view of the same tip after insertion into the bond region.

FIG. 9a illustrates the temperature profile of a typical bonding tip 33 prior to engagement with a pair of lead workpieces, for example, the circular battery plates shown in FIG. 1. As shown, the bonding tip extends outwardly from an electrically and thermally nonconductive backup plate 48. In the idle condition, all portions of the bonding tip are at approximately the same temperature, illustratively 1,200° F. FIG. 9b shows the temperature profile of tip 33 after it has been inserted into the body of a pair of lead bonding lugs 22. As discussed with reference to FIG. 4, the insertion of bonding tip 33 into a pair of abutted bonding lugs creates a localized zone of molten material 38 about the tip. Because tip 33 is being advanced relative to the bonding lugs, and because of turbulence and other disturbances within the zone of molten material, portions of the bonding tip will be in contact with molten lead at a temperature of approximately 630° F. and, portions of the tip will momentarily not be in contact with anything. Since it is not possible to predict, at any instant, which portions of the bonding tip will be in contact with molten lead and which portions will not be in contact with molten lead, it is not possible, by conventional means, to compensate for the uneven temperature profile which results over the surface of the tip 33. Thus, as shown in FIG. 9b, portions of the bonding tip are at 630° F. and others are at 1,200° F. This extreme temperature profile may result, in some instances, in unpredictable and in poor quality bonds and in premature burnout of the tip.

Figure 9C:
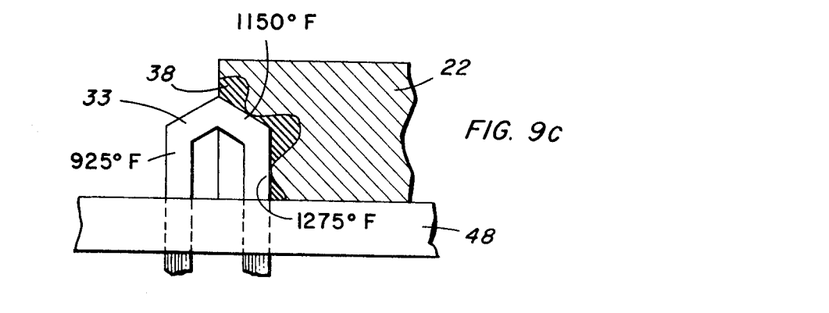
FIG. 9c is another view of the tip after insertion into the bond region but with a compensating heating current applied between the tip and the workpieces.
Figure 11:
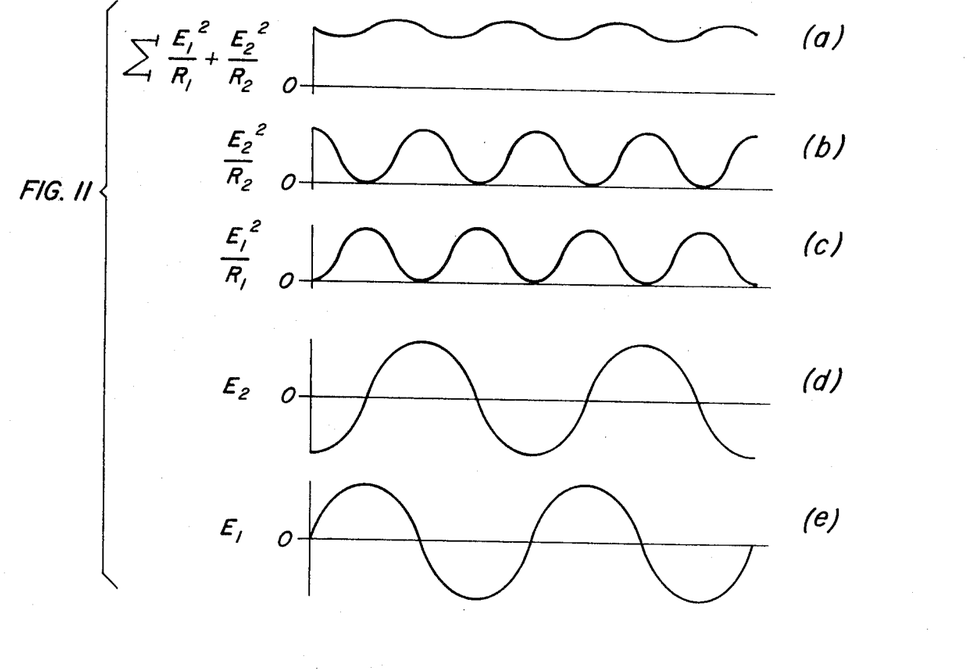
FIG. 11 is a graph illustrating the relationships between the electrical and thermal energy waves of the circuit of FIG. 10.

The primary source of heating for tip 33 is provided by the passage of a first electrical current through the tip or by conduction from a cartridge type heating element located within the body of bonding tool 34. It has been discovered that the uneven temperature profile of the tip can be reduced drastically by the provision of a supplementary, secondary heating source. This second heat source is provided by connecting a second electrical source between the tip and one or both of the workpieces so that a heating current flows in a circuit including the tip and the workpieces. Measurements made with a temperature probe indicate that this supplementary $i^2R$ heating is concentrated in those portions of the bonding tip which contact solid lead, as shown in FIG. 9c. Thus, the flow of heat energy from the primary heating source into the solid portions of the workpieces (which flow tends to lower the temperature at those interfaces) is offset by the $i^2R$ heating which occurs at the same interfaces caused by the secondary heating current flowing in the circuit including the bonding tip and the workpieces. As illustrated in FIG. 9c, there is still a slight variation in the temperature profile of the bonding tool. This is believed to be caused by variations in the density of the supplementary current flowing through the workpieces, but these variations are small and may be ignored. Because of the high currents required, both the potential applied to the bonding tip and the potential applied between the bonding tip and the workpieces are most conveniently obtained by stepping-down commercial 115-volt AC mains. Typical figures for the voltage and current applied to bonding tip 33 and between the tip and the workpieces are from one-half to 3 volts AC and from 150 to 500 amperes.

Where alternating currents are used to supply both the direct and indirect heating of the interface, sinusoidal fluctuations in the temperature of the bonding tip may be expected. These fluctuations are undesirable in that they affect the rate at which the workpieces are melted and hence the quality of the bond. It has been discovered that these temperature fluctuations may be minimized by adjusting the relative phase between the 193 current supplied directly to the bonding tip and the supplementary heating current supplied between the bonding tip and the workpieces. FIGS. 11a through 11e illustrate the electrical and thermal waveforms which are found when a supplemental bonding current is applied to the arrangement illustrated in FIGS. 4 and 9c. FIGS. 11e and 11d respectively represent the amplitude of the direct heating supply $E_1$ applied to the bonding tip and the supplemental heating supply $E_2$ applied between the tip and the workpieces. FIGS. 11c and 11b correspondingly represent the $i^2R$ heating of the bond interface which results from the application of potentials $E_1$ and $E_2$. If $E_1$ and $E_2$ are sinusoidal, as illustrated in FIGS. 11c and 11d, the thermal waves will also be sinusoidal, but since the heating effect is insensitive to the polarity of potentials $E_1$ and $E_2$, the thermal waves are at twice the input frequency of potentials $E_1$ and $E_2$. FIG. 11a represents the algebraic sum of the thermal waves shown in FIGS. 11c and 11b.

If, as shown, the relative phase of sources $E_1$ and $E_2$ is adjusted so that the two waves are 90° out of phase, then the thermal waves will compliment each other and the resultant wave, shown in FIG. 11a, will be essentially constant, indicating that the heat supplied to the bond interface is not time varying. This results in a more uniform bond than would be obtained if either the direct (FIG. 11c) or indirect (FIG. 11d) heating currents were used alone. Actually, because of thermal inertia and other considerations, the thermal waveforms are not truly sinusoidal and, thus, even when summed do not result in a perfectly uniform heating effect. Further, the actual phase shift required to optimize the graph shown in FIG. 11a may be more, or less, than the theoretical 90° figure, and usually must be empirically determined, by observation, for each type of bonding application.

Figure 10:
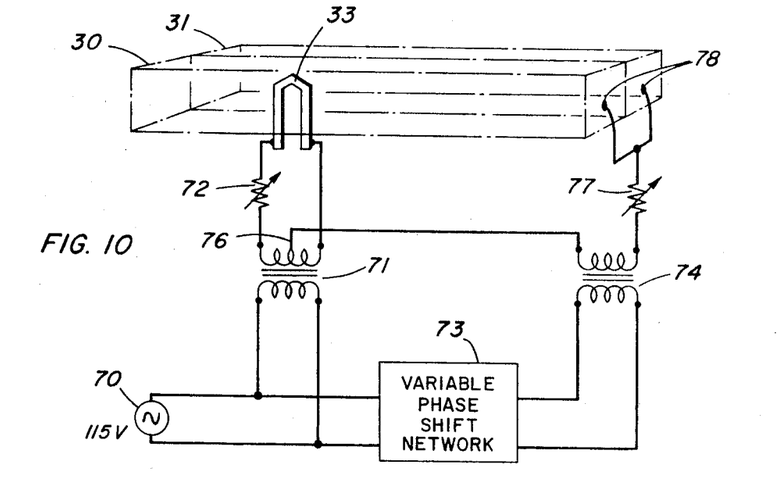
FIG. 10 is a partially schematic, partially diagrammatic circuit diagram showing an illustrative arrangement for supplying a compensating heating current to the tip.

FIG. 10 shows an illustrative circuit arrangement which may be used to provide a supplemental bonding current for the apparatus shown in FIGS. 5 and 6 when used to bond the circular lead battery plates as shown in FIG. 1. Potential from the AC mains 70 is applied to the primary winding of a first transformer 71, which steps the voltage down to approximately 2 volts. The voltage on the secondary of transformer 71 is then applied to tip 33 of bonding tool 34 which is inserted within the body of abutted workpieces 30 and 31. A first variable resistor 72 in the secondary circuit of transformer 71 is provided to adjust the current through tip 33 to the desired amount. Potential from AC mains 70 is also fed, through a variable phase shift network 73, to the primary of a second AC transformer 74. One lead of the secondary winding of transformer 74 is connected to a midpoint tap 76 on the secondary winding of first transformer 71, and the other lead is connected through a second variable resistor 77 to a contact 78 on either (or both) of workpieces 30 and 31. As an alternative to the use of variable resistors 72 and 77 to control the bonding tip current and lead current, respectively, both transformers 71 and 74 could be variable autotransformers, if desired.

The circuitry illustrated in FIG. 10 will thus apply a first alternating potential ($E_1$ in FIG. 11e) directly to tip 33 to raise the temperature thereof above the melting point of workpieces 30 and 31. Further, when tip 33 is inserted into the body of the workpieces the potential ($E_2$ of FIG. 11d) supplied by transformer 74 will cause a second, and supplemental, current to flow symmetrically from the surface of tip 33, through both first workpiece 30 and second workpiece 31, contacts 78, and back to transformer 74 to provide the previously discussed supplemental heating of the bonding tip.

As an alternative to the use of phase shift network 73, the primary of transformers 71 and 74 could be connected to two of the phases of a three-phase electrical system and, although this would result in a phase shift of 120° between the direct and supplemental heating currents rather than the theoretically 90°, the temperature profile of the bonding tip will, nevertheless, produce a bond which is superior to that which would be obtained by the use of either the direct or supplemental heating current alone.

In FIG. 10 the secondary transformer 74 is shown connected to a midpoint top on transformer 71. This balances the current evenly between both halves of the bonding tip 33. If desired, the connection may be made directly to the leading or trailing edge of the tip. This latter connection provides a form of feedback so that if the lead current drops, the bonding current increases in an offsetting manner, to maintain a fairly constant heating effect at the interface.

Figure 12:
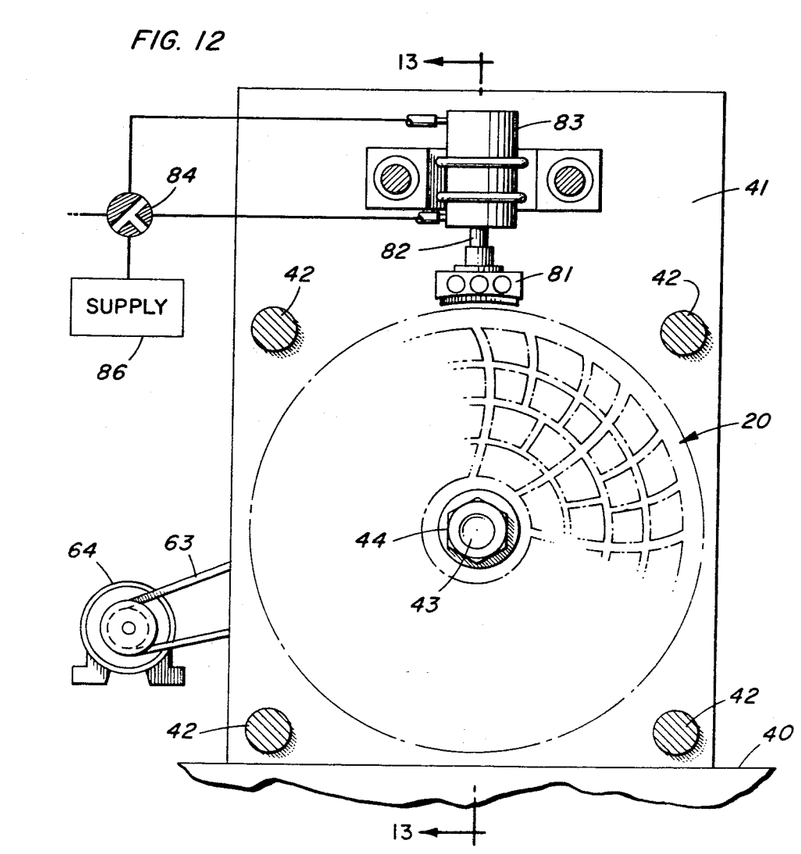
FIG. 12 is a front elevation view of an alternative bonding apparatus for bonding the circular battery plates of FIG. 1.
Figure 13:
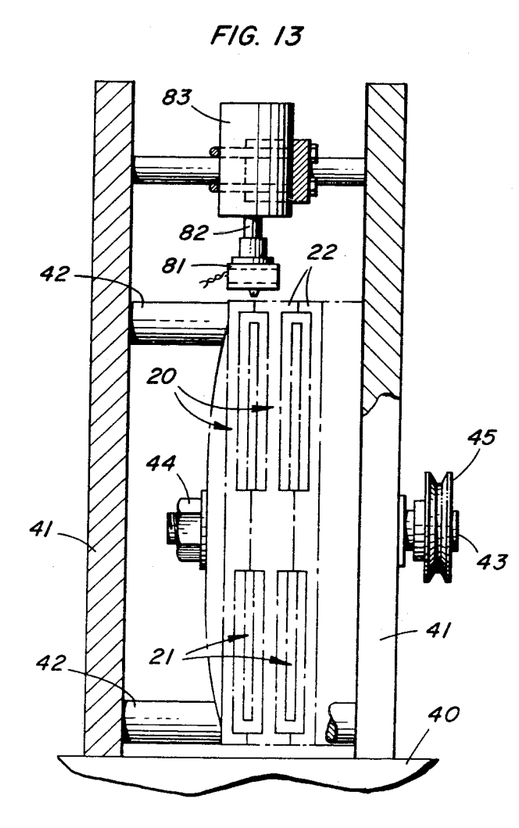
FIG. 13 is a partial section taken about line 13–13 of the bonding apparatus illustrated in FIG. 12.

FIGS. 12 and 13 illustrate an alternative embodiment of the invention in which the transfer of thermal energy into the bond interface is accomplished by plunging a heated ram simultaneously into all portions of the interface. In the embodiment of the invention illustrated in FIGS. 3 and 4, the heated bonding tool traverses the length of the bond interface. In the embodiment illustrated in FIGS. 12 and 13, the heated bonding tool traverses the depth of the interface, rather than the length, but the bonding mechanism is identical. The details of the apparatus are essentially similar to those shown in FIGS. 5 and 6 and will not be discussed in detail. It will be noted, however, that the battery assembly is now located beneath the bonding tool. As shown, the movable carriage 53 and support 74 of FIGS. 5 and 6 are replaced by a suitably shaped bonding ram 81 mounted to a shaft 82. Shaft 82 and hence ram 81 are adapted for reciprocal movement in the vertical plane under control of piston 83 and valve 84 connecting the piston to a supply of compressed air 86.

Figure 14:
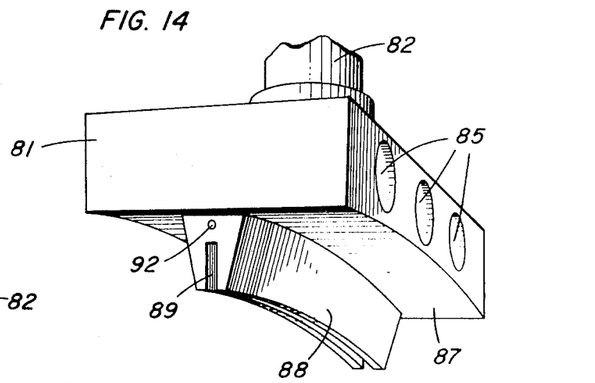
FIG. 14 is an isometric view of a heated bonding ram for use in the apparatus of FIGS. 12 and 13.

Ram 81 is illustrated in greater detail in FIG. 14. As shown therein, ram 81 has an arcuately shaped lower surface 87 adapted to engage the outer surface of a pair of correspondingly shaped abutted bonding lugs 22. Even though itself heated, arcuate surface 87 tends to restrain flow of molten lead away from the bond interface. An arcuate bonding tip 88 having a generally trapezoidal cross section extends downwardly from surface 87 and is provided with a slot 89 to receive any molten lead which may be displaced by tip 88 when it is pressed into engagement with the abutted bonding lugs 22. An air vent 92 is provided at either end of bonding tip 88, adjacent the upper surface of recessed slot 89, to vent any air which may be displaced by the molten lead entering the slot from the bond interface. If necessary, a vacuum (not shown) may be connected to vent 92 to assist in drawing the molten lead up into the ram. The ram is further provided with a plurality of apertures 85 to receive electrical cartridge heaters (not shown) or other suitable heating means.

Referring again to FIGS. 12 and 13, in operation, the battery assembly is mounted in the bonding apparatus in the manner previously described with reference to FIGS. 5 and 6. Electrical energy is then supplied to the cartridge heaters located within apertures 85 of ram 81 to raise the temperature of ram tip 88 above the melting point of the lead lugs to be bonded. Valve 84 is then opened to supply pressurized air from supply 86 to cylinder 83 thereby forcing heated ram 81 downward into engagement with the first pair of abutted bonding lugs 22. As ram 81 is lowered by cylinder 83 and ram tip 88 (FIGS. 14 and 15) forced into engagement with the interface between the workpieces, thermal energy is transferred into the workpieces by means of thermal conduction thereby melting the lead. Some of the molten lead is pushed aside by the sloping outer walls of ram tip 88 but most is stored within slot 89. After sufficient time has elapsed to melt all the lead beneath ram tip 88 and extend the molten zone for the entire depth D of the bond interface, valve 84 is closed and ram 81 is withdrawn from the workpieces. As ram 81 is removed the molten lead stored in slot 89 falls back into the bond interface forming a fusion bond between the two workpieces.

Motor 64 and drive belt 63 (FIG. 12) are then activated to rotate the battery assembly and index the next pair of abutted bonding lugs beneath the heated ram. This process is reiterated until all the remaining pairs of bonding lugs have been joined.

Unlike the apparatus shown in FIGS. 5 and 6, no substantial wiping motion occurs between the heated ram and the workpieces. It thus becomes important, in this embodiment of the invention, to clean the ram between each bond. The previously mentioned air blast or wire-tipped brush have proved satisfactory for this purpose.

Figure 15:
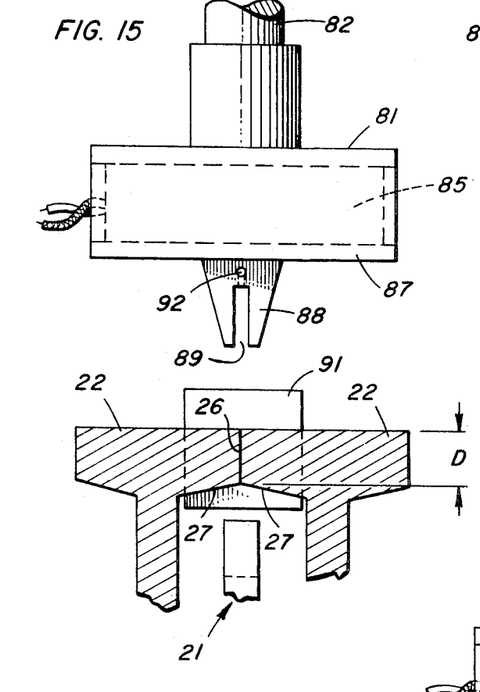
FIG. 15 is a partial cross-sectional view of the bonding ram illustrated in FIG. 14 prior to engagement with a pair of abutted workpieces.
Figure 16:
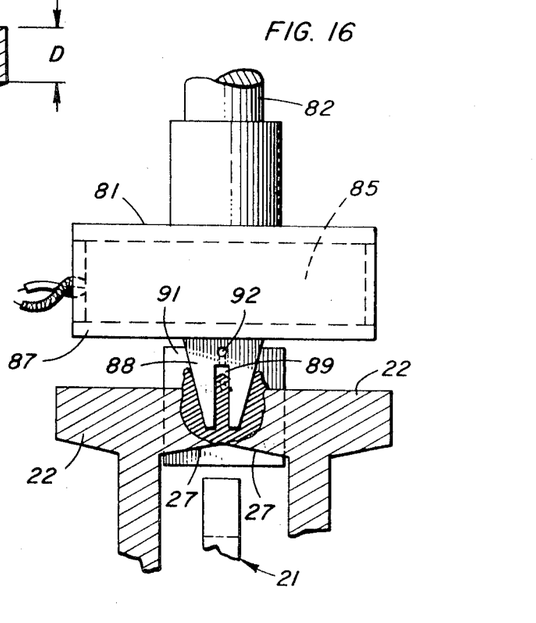
FIG. 16 is another cross-sectional view of the bonding ram of FIG. 14 after it has engaged the abutted workpieces.

In the embodiment of the invention disclosed in FIGS. 5 and 6, the heated bonding tip is inserted into the bond regions from below. Backup plate 36, which contacts the lower surface of the bonding lugs, tends to restrain gravitational flow of molten material away from the bond region. By way of contrast, in the embodiment of the invention illustrated in FIGS. 12 and 13, the heated ram is inserted into the bond region from the top and there is thus a tendency for molten material to flow away from the bond regions to the left and to the right as well as directly downwards. For this reason, it is necessary to provide a confining member 91 for the rear surfaces 27 and side portions of bonding lugs 22, as shown in FIGS. 15 and 16. As previously discussed, because of the interleaved structure of positive and negative plates inherent in the design of a circular battery, it is difficult to gain access to the rear surfaces 27 of bonding lugs 22. However, if confining member 91 is manufactured from a chemically inert material and inserted around bonding lugs 22 as the battery plates are assembled, this difficulty can be overcome. Advantageously, confining member 91 is comprised of the same foamed fiberglass or polyurethane material used to separate positive and negative plates 20 and 21. Thus, confining members 91 can safely be left in place after all bonds have been completed and the battery finally assembled and filled with electrolyte.

FIG. 16 illustrates the manner in which the molten material displaced by tip 88 of heated ram 81 is forced upward into recessed slot 89 as the heated ram is inserted into the bond interface. The displacement of the piston in cylinder 83 is adjusted so that ram tip 88 extends sufficiently far into the bond interface to completely melt the workpiece material for the entire depth of the workpieces. After the initial, minimum displacement further penetration of the tip into the workpieces controls the width of the melt zone on the inside bottom of the bond. For example, with lead lugs three-sixteenths inch thick, if the tip penetrates to within one thirty-second inch of the bottom a very narrow bond will result. As was the case with the previously discussed embodiment, this is necessary to avoid the presence of cracks in the bond, which might lead to premature failure of the battery.

Figure 17A:
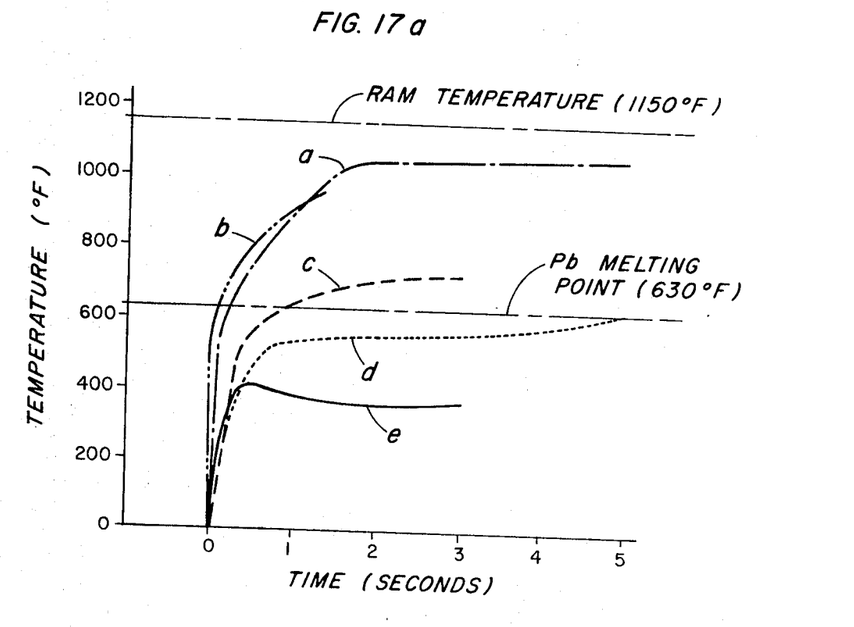
FIG. 17a is a graph illustrating the relationship between the temperature of the bond region and the applied force for bonding rams of different material.
Figure 17B:
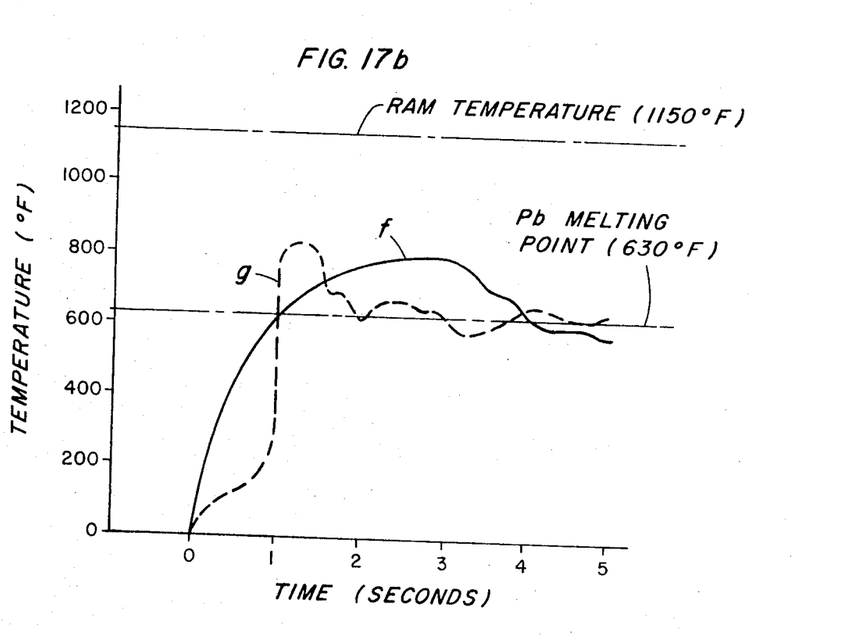
FIG. 17b is a graph illustrating the bond temperature characteristics for different heating conditions of the ram.

FIGS. 17a and 17b represent the results of a series of bonding experiments performed on a typical lead workpiece. The graphs illustrated in FIGS. 17a and b were prepared from photographs taken of the face of a cathode-ray oscilloscope connected via a thermocouple to the workpieces. The thermocouple was mounted on the top of a pair of lead workpieces approximately the same size and shape as two battery bonding lugs (i.e., three-sixteenths inch × three-fourths inch × 2½ inches). The ram was heated to an idle temperature of approximately 1,150° F. and brought down into the workpieces with a controlled force of from 10 to 150 pounds.

Referring to FIG. 17a, trace a illustrates that a copper ram brought down with a force of 20 pounds will raise the temperature of the bond interface to the melting point of lead (630° F.) in 0.2 second. Trace b illustrates that when the applied force is 150 pounds, the time required to melt the lead will be 0.1 second. Trace c similarly illustrates that when the force is 10 pounds, the time required to melt the lead will be approximately 0.9 second.

By way of contrast, trace d illustrates that when a ram constructed from stainless steel or type 718 nickel-chromium alloy is urged into the workpieces with a force of 150 pounds, it will take up to 5 seconds to melt the workpieces. If the applied force is reduced to 50 pounds, however, the lead workpieces never attain the critical 630° F. melting point and no bond will be formed. In comparing traces c and e, it will be observed that a satisfactory bond was not produced between the workpieces by a stainless steel ram using forces up to 15 times greater than those which produced a satisfactory bond with a copper ram.

The explanation for this fact will be apparent when the nature of the bonding mechanism at work in both of the previously described illustrative embodiments is considered. In both instances, a heated bonding tool is inserted into a pair of abutted workpieces and moved, relative to the workpieces, so that the tool traverses the interface between the workpieces and creates a localized zone of molten material about the tool. Thus, in both instances, thermal energy must be transferred from a heat source, through the bonding tool, into the workpieces not only at a temperature which is high enough to melt the workpieces, but at a rate sufficient to maintain a molten zone about the tool as the tool traverses the interface.

The temperature requirements, of course, are a function of the material from which the workpieces are constructed. Similarly, the amount of heat flow necessary at that temperature is a function of the size of the workpieces. One factor affecting the amount of heat flow necessary is the magnitude of the heat source supplying the thermal energy (bonding tip current in FIG. 5; wattage and quantity of heating elements in FIG. 12). Another factor is the thermal resistance of the bonding tool. As previously mentioned with reference to bonding tip 33 in FIG. 4, it is necessary that the bonding tool or ram be comprised of a material which is a good thermal conductor. In the case of the heated ram illustrated in FIG. 14, thermal energy flows outward from the heating elements located in apertures 85 through ram 82 and ram tip 88 into the workpieces to melt the lead about tip 88. If the thermal resistance in this path is too great, thermal energy will be transferred into the mass of the workpieces, which act as a heat sink, faster than it can be replaced. Put another way, while the temperature of the workpieces immediately below ram tip 88 may attain 630° F., the melting point of lead, and a small quantity of lead may actually be melted, the high thermal resistance in the heat path will prevent the transfer of heat energy into the workpieces at a sufficient rate to maintain a localized zone of molten material about the bonding tool as it attempts to traverse the interface.

Thus, good thermal conductors such as copper, which has a thermal conductivity of 1.00 calories/sec./cm.$^3$/° C. will produce fusion bonds at moderate pressures whereas relatively poor conductors, such as stainless steel, which has a thermal conductivity of only 0.115 calories/sec./cm.$^3$/° C. will not.

Referring now to FIG. 17b, trace f and trace g both illustrate the temperature characteristics obtained with a copper ram with an applied bonding force of 10 pounds. Trace f resulted when a constant heat source was connected to the ram, and trace g was obtained when the heat source was disconnected, immediately prior to impact between the ram and the workpieces. It will be noted that in both instances the time taken to reach the melting point of lead is approximately the same. This demonstrates that the second embodiment of the invention utilizes stored thermal energy to form the fusion bond.

It will be apparent to one skilled in the art that various changes and substitutions may be made in the components and layout of parts without departing from the spirit and scope of the invention. It will also be apparent that, while the invention has been disclosed and illustrated with reference to lead workpieces, other metal or metallic workpieces may equally well be bonded by the methods and apparatus of this invention.

What I claim is:

1. A method of bonding a first metallic workpiece to a second metallic workpiece, including the step of abutting said first and second workpieces to define a bonding interface therebetween, characterized by the further steps of:

applying energy to a bonding tool to heat said bonding tool to a temperature above the melting point of said workpieces;

inserting said bonding tool into said first and second workpieces, at said interface, and simultaneously supplementing the energy applied to said bonding tool to maintain the temperature of the bonding tool above the melting point of said workpieces to thereby form, and maintain, a zone of molten, metallic material about said bonding tool; and moving said bonding tool, relative to said first and second workpieces, so that the bonding tool traverses at least a portion of said interface, said zone of molten material resolidifying and returning to a crystalline state behind the trailing edge of said bonding tool, as the bonding tool traverses said interface, thereby bonding said first and second workpieces together.

2. A method of bonding a first metallic workpiece to a second metallic workpiece, including the step of abutting said first and second workpieces to define a bonding interface therebetween characterized by the further steps of:

inserting a bonding tool, heated by a first alternating electrical current to a temperature above the melting point of said workpieces, into said first and second workpieces, at said interface, to form a zone of molten metallic material about said bonding tool;

moving said bonding tool, relative to said first and second workpieces, so that said bonding tool traverses at least a portion of said interface, said zone of molten material resolidifying and returning to a crystalline state behind the trailing edge of said bonding tool as said bonding tool traverses said interface;

passing a second alternating electrical current through a circuit including said bonding tool and at least one of said first and second workpieces to supplementally heat those portions of said bonding tool where said bonding tool is in physical contact with as yet unmelted portions of said workpieces, as said bonding tool is moved through said interface; and adjusting the relative phase of said first and second currents so that the supplemental heating of the bonding tool, and the workpieces, produced by said second current cooperates with the direct heating thereof provided by said first current to maintain an even temperature profile over the surface of said bonding tool, as the bonding tool moves within the body of said workpieces, whereby said first and second workpieces are bonded together.

3. A method of bonding according to claim 2 characterized in that:

said first and second workpieces have a generally arcuate configuration in the region of the bond;

said bonding tool extends outwardly from a correspondingly arcuate-shaped, electrically nonconducting support member; and said method comprises the further step of:

abutting said support member against the outer surface of said arcuately shaped first and second workpieces, in the region of said interface, to restrain gravitational flow of molten metal away from the bond area.

4. Apparatus for bonding a first metallic workpiece to a second metallic workpiece, including clamping means for maintaining said first and second workpieces in abutting relation and for defining a bonding interface therebetween prior to, and during, said bonding, characterized in that the apparatus further comprises:

a bonding tool comprised of material which conducts electrical current;

means for raising the temperature of said bonding tool to at least the melting point of said first and second workpieces;

means for inserting said bonding tool into said first and second workpieces, at said interface, to form a local zone of molten material therein;

means for moving said bonding tool, relative to said first and second workpieces, so that said bonding tool traverses at least a portion of said interface, said zone of molten material resolidifying behind the trailing edge of said bonding tool as said bonding tool traverses said interface; and first circuitry connected to said bonding tool, and to at least one of said first and second workpieces, for supplying a first electrical current to those portions of said bonding tool in contact with as yet unmelted portions of said workpieces to supplement the heat supplied to the workpieces by said temperature raising means, as said bonding tool traverses said interface, whereby said first and second workpieces are bonded together.

5. Apparatus according to claim 4 characterized in that said temperature raising means comprises second circuitry, connected to said bonding tool, for supplying a second electrical current thereto to heat the tool to a temperature in excess of the melting point of said first and second workpieces.

6. Apparatus according to claim 5 characterized in that said first and second electrical currents are alternating currents and the apparatus further comprises:

means for adjusting the phase relationship between said first and second alternating currents so that the heating effects thereof compliment each other to ensure an even temperature profile over the surface of said bonding tool, even in the presence of thermal conduction from said tool into the body of said first and second workpieces.

7. Apparatus according to claim 4 characterized in that said means for inserting comprises:

a movable carriage;

an electrically nonconducting backup plate mounted to said carriage, said backup plate having an aperture therein to receive said bonding tool; and means for inserting said bonding tool a predetermined distance through said aperture to control the depth of penetration of said bonding tool into said first and second workpieces when said backup plate is moved into engaging contact with said first and second workpieces.

8. Apparatus according to claim 7 characterized in that:

said means for moving comprises an electric motor attached to said movable carriage to advance said carriage towards said first and second workpieces.